United States Patent [19]

Hougen

[11] 4,204,783
[45] May 27, 1980

[54] MACHINE FOR CUTTING HOLES WITH ANNULAR CUTTERS

[76] Inventor: Everett D. Hougen, G-5072 Corunna Rd., Flint, Mich. 48504

[21] Appl. No.: 16,433

[22] Filed: Mar. 1, 1979

[51] Int. Cl.² .................... B23B 47/00; B23B 51/04
[52] U.S. Cl. ................................. 408/68; 408/204
[58] Field of Search .................. 408/68, 201, 10, 11, 408/13, 8, 82, 204, 205, 206, 703

[56] References Cited

U.S. PATENT DOCUMENTS

| | | | |
|---|---|---|---|
| 1,705,049 | 3/1929 | Fournier | 408/68 |
| 2,484,150 | 10/1949 | Brown | 408/68 |
| 3,104,564 | 9/1963 | Hougen | 408/68 X |
| 3,266,346 | 8/1966 | Voissem | 408/68 |
| 3,825,362 | 7/1974 | Hougen | 408/68 |
| 4,090,804 | 5/1978 | Haley | 408/204 X |

Primary Examiner—William R. Briggs
Attorney, Agent, or Firm—Barnes, Kisselle, Raisch & Choate

[57] ABSTRACT

There is disclosed an air motor adapted to rotate and axially shift an arbor having an annular cutter attached thereto. Within the arbor a plunger is slideably arranged with its leading end bearing against a pointed pilot pin at the center of the cutter. The plunger is biased forwardly by either a spring cartridge or a piston-cylinder assembly so as to apply a predetermined constant or programmable pressure on the pilot pin throughout the entire cutting cycle. When the cutter penetrates through the under face of the workpiece, the pressure on the plunger is reduced to a very low value so that the slug within the cutter will be ejected at a relatively slow safe velocity.

32 Claims, 10 Drawing Figures

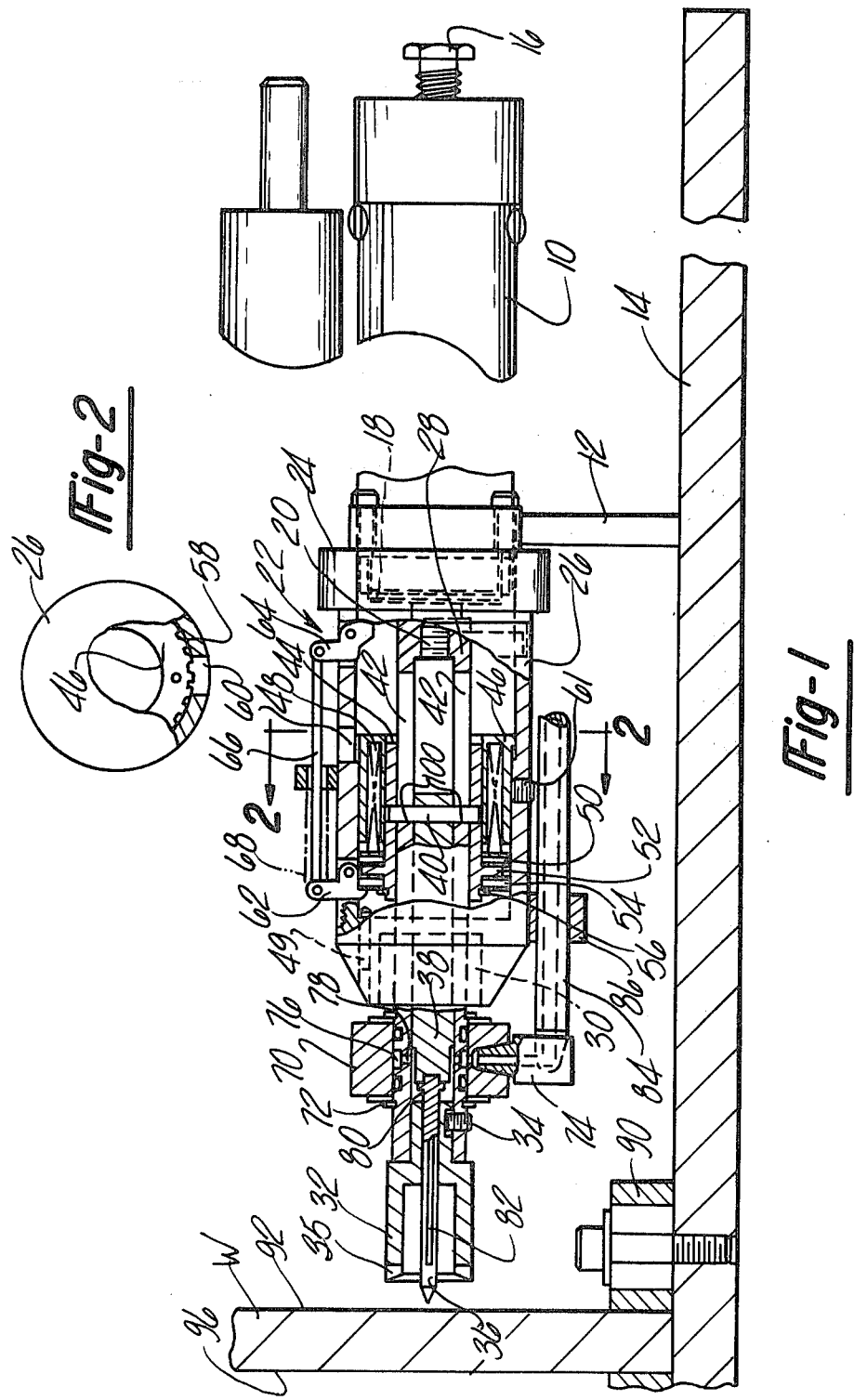

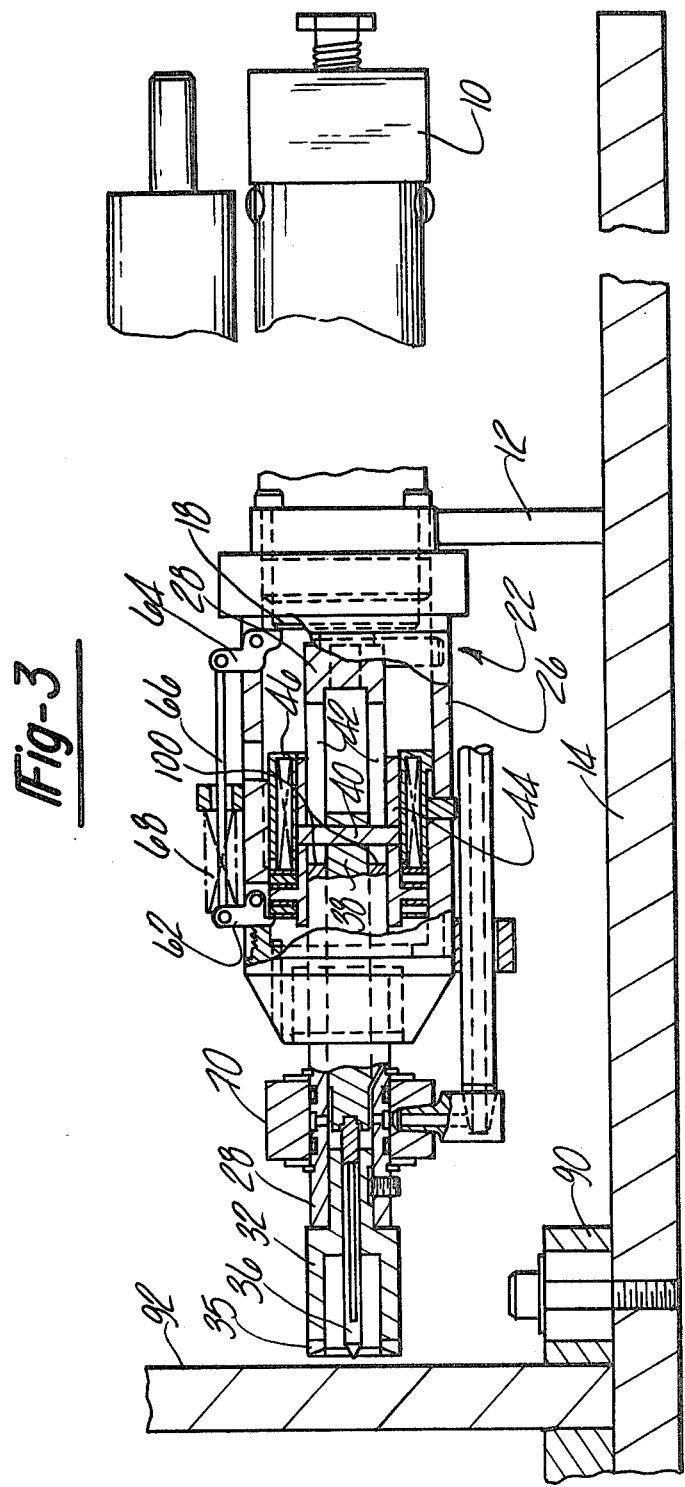

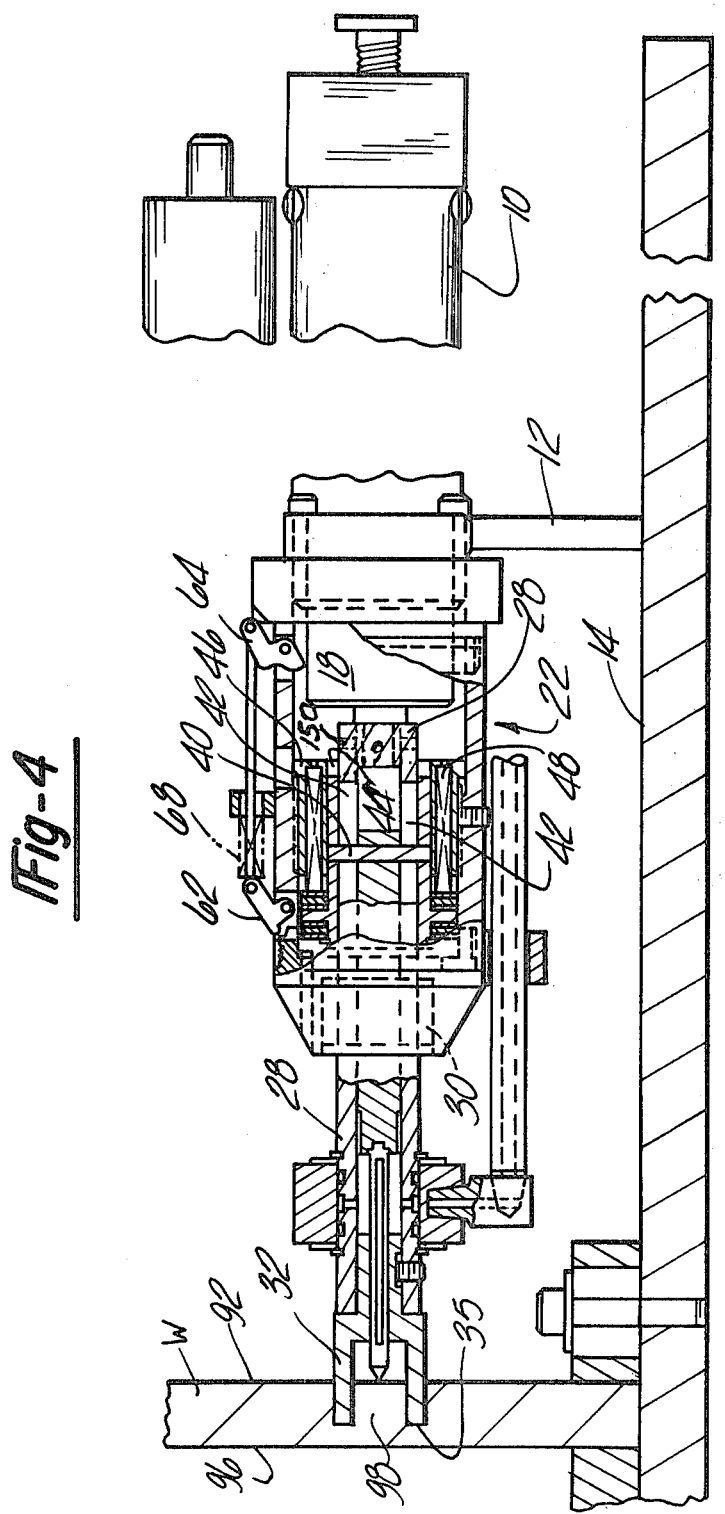

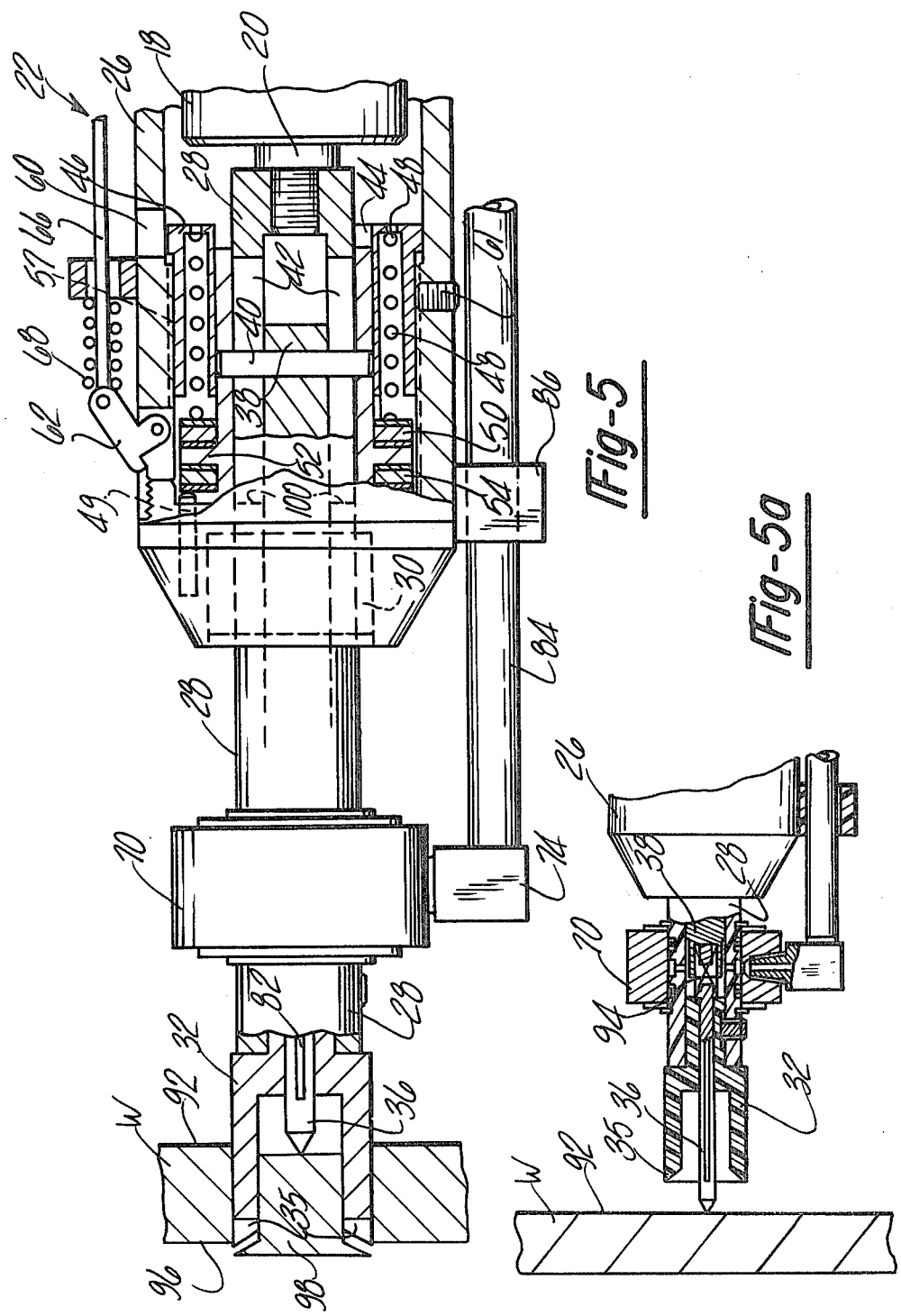

MACHINE FOR CUTTING HOLES WITH ANNULAR CUTTERS

This invention relates to a hole cutting machine and, more particularly, to a machine employing an annular cutter for forming holes in a workpiece.

Annular hole cutters are cup-shaped and provided with a plurality of cutting teeth around the leading open end of the cutter which are adapted to cut a circular groove through the workpiece, leaving a cylindrical slug within the cutter when the cutting teeth penetrate through the bottom face of the workpiece. Such cutters are frequently provided with a central pointed pilot pin, the purpose of which is to maintain the cutting teeth concentric to the hole being formed and also to eject the center slug so formed from within the cutter when the cutter penetrates completely through the workpiece. The pilot pin is normally biased axially outwardly of the cutter by a compression spring. As the cutter penetrates through the workpiece the spring is progressively compressed since the pilot pin remains engaged with the top face of the workpiece until the cutting teeth penetrate through the back surface of the workpiece.

Cutters of the type described have several drawbacks. As a practical matter it is difficult to economically grind or otherwise form all of the teeth on the cutter to exactly the same shape and size. Consequently, in use, and especially at initiation of a cut, one or two teeth will engage the workpiece sooner and with a greater force than the remaining teeth. This also occurs when the plane of the cutting teeth does not lie in a plane accurately parallel to the surface of the workpiece engaged by the cutter. In either event, this tends to produce a side thrust on the cutter and results in a hole which is oversize or out-of-round. In an attempt to overcome this problem cutters and arbors have been designed heretofore so that the compression spring applies relatively high compression force on the cutter at the initiation of the cut. However, the spring load increases as the cutter penetrates through the work. This not only requires a relatively long arbor for the cutter to accommodate the axial compression of the spring, but also leads to additional problems.

Since the necessary pressure on the pilot pin must, of necessity, be relatively high in many cases in order to retain the cutter accurately concentric to the pilot pin, it follows that with cutters of the type described the spring pressure is substantially greater at the end of the cut than at initiation of the cutting action. Therefore, the pilot pin has a tendency to eject the center slug from within the cutter at a very high velocity when the cutter penetrates through the back face of the workpiece. This creates a dangerous condition and can result in injury and damage.

If the initial force on the pilot pin is sufficiently high at the initiation of the cut to maintain it in an accurately centered condition relative to the axis of the hole being cut, the increased force on the pilot pin as the cutter penetrates progressively deeper into the workpiece places a greater load on the machine driving the cutter. Thus, the mass of the machine and its power requirements must, of necessity, be sufficiently great to withstand the extremely high pressures encountered at the end of the cut. The extremely high pilot pin pressures encountered require frequent resharpening of the pilot pin. A sharp point on the pilot pin is essential to cut a hole which is accurately concentric to its center axis. In addition, if the pilot pin pressure is excessively high as the cutter teeth approach the bottom face of the workpiece, there is a tendency for the center slug to shear out of the workpiece before the cutter teeth actually penetrate completely through the bottom face of the workpiece. This causes the center slug to be extruded or sheared from the workpiece as the cutter approaches the back face of the workpiece, thus producing a large burr around the edge of the hole. This excessive pressure also tends to cause deflection in the workpiece such as when a hole is cut through an unsupported leg of yokeshaped member.

Some hole cutting machines employing annular cutters are designed so that the pilot pin pressure on the workpiece reaches a maximum value when the cutting teeth initially engage the workpiece and remains substantially constant until the cutting teeth penetrate through the bottom face of the workpiece. Such machines do not completely solve all of the above-mentioned problems. The maximum pilot pin pressure is not readily adjustable on such machines to accommodate workpieces of substantially different characteristics. The pilot pin pressure required to maintain accurate concentricity on a thin plastic workpiece would be substantially less than for a thick steel workpiece. Thus, with such machines, unless considerable time is spent dismantling the cutter and arbor and changing the size of springs, spacers, etc., the pilot pin will exert the same pressure regardless of the thickness of the workpiece and regardless of whether the workpiece is steel, aluminum or plastic. In addition, with such machines the spring pressure on the pilot pin is exerted against the center slug cut from the workpiece until the pilot pin has returned to its initial free position relative to the teeth of the cutter, that is, where the pointed end of the pilot pin projects beyond the cutter teeth. Thus, if a workpiece is relatively thick the duration of the force exerted on the center slug after it is cut free is, in many instances, still sufficiently great to eject the slug from the cutter at a relatively high and dangerous velocity and to also shear the slug from the workpiece creating a burr or a crater-like section around the edge of the hole at the bottom face of the workpiece.

The primary object of this invention is to provide a hole cutting machine for use with an annular cutter wherein a maximum predetermined force is applied by the pilot pin to the workpiece when the cutting action is initiated.

Another object of this invention is to provide a machine of the type described wherein the pilot pin applies a predetermined programmable pressure to the workpiece throughout the cutting operation.

A further object of the invention is to enable easy and quick adjustment of the pressure applied to the workpiece by the pilot pin.

Another object of the invention is the provision of means capable of applying a very high pilot pressure at the initiation of the cut, maintaining the high pressure to a predetermined depth and then reducing the pressure as desired. This is especially desirable since, if the cut initially established is accurate and concentric, the cutter has a tendency to pilot itself on the side wall of the hole and center slug as it penetrates through the workpiece.

Another object of the invention is to reduce to a very low magnitude, even zero, the force applied to the workpiece by the pilot pin substantially immediately or shortly before or after the cutter penetrates through the workpiece so that the slug ejection velocity is at a safe low value regardless of the thickness of the workpiece and so that the slug is not sheared from the workpiece.

A still further object of the invention resides in the provision of a machine for cutting very accurately concentric holes in a workpiece by means of an annular cutter which avoids the drawbacks and problems associated with conventional machines employing such cutters.

Other objects, features and advantages of the present invention will become apparent from the following description and accompanying drawings, in which:

FIG. 1 is a side elevational view, partly in section, of a machine according to the present invention wherein the pilot pin is forced into the workpiece by spring pressure;

FIG. 2 is a fragmentary sectional view along the line 2—2 in FIG. 1;

FIGS. 3, 4 and 5 are views similar to FIG. 1 and showing the relative positions of various components of the machine throughout the successive stages of the hole cutting operation;

FIG. 5A is a fragmentary side elevational view, partly in section, showing a modification of the machine;

Figure 6:
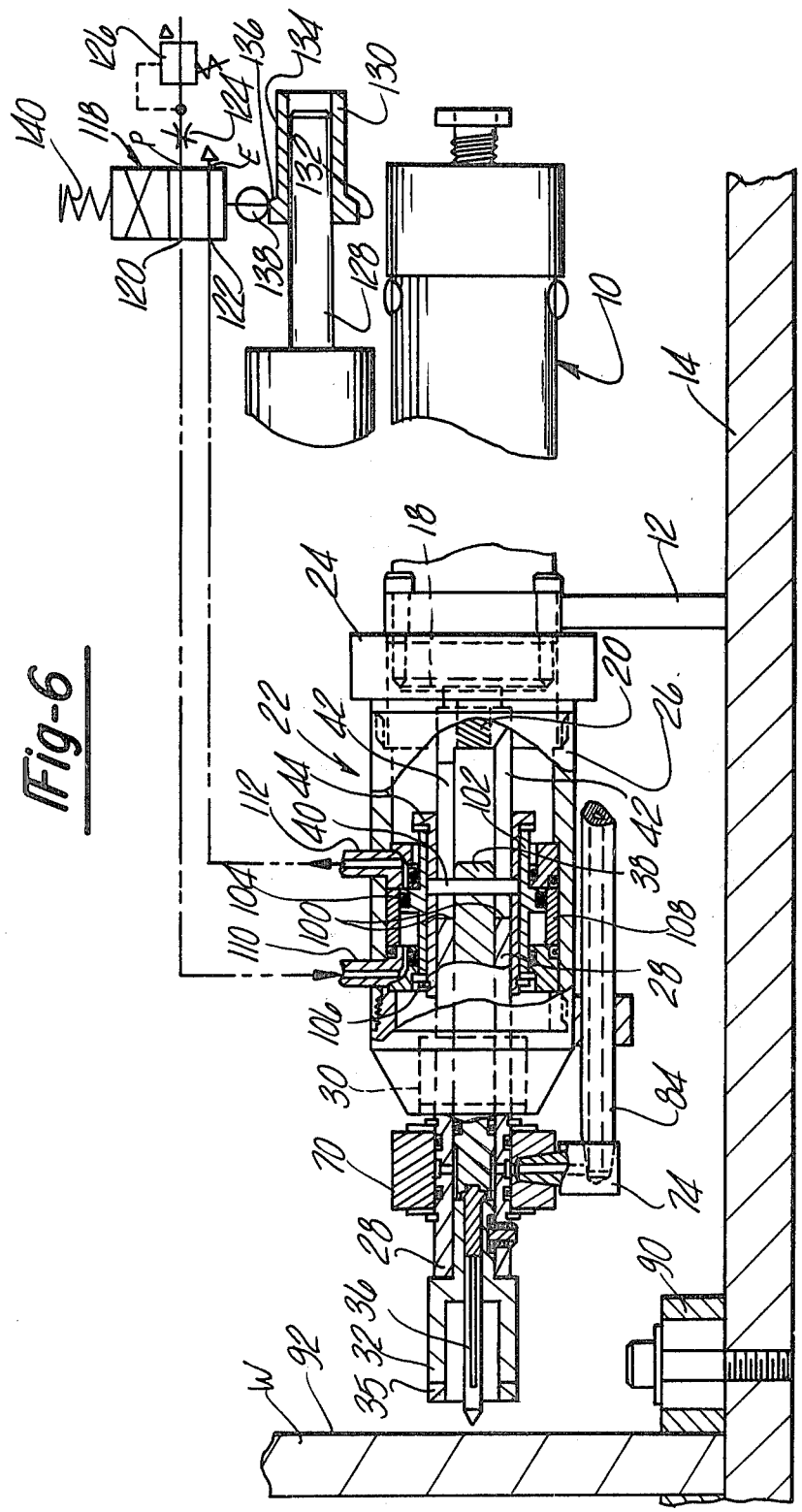
FIG. 6 is a side elevational view, partly in section, showing another modification of the machine wherein fluid pressure is utilized to force the pilot pin against the workpiece.
Figure 7:
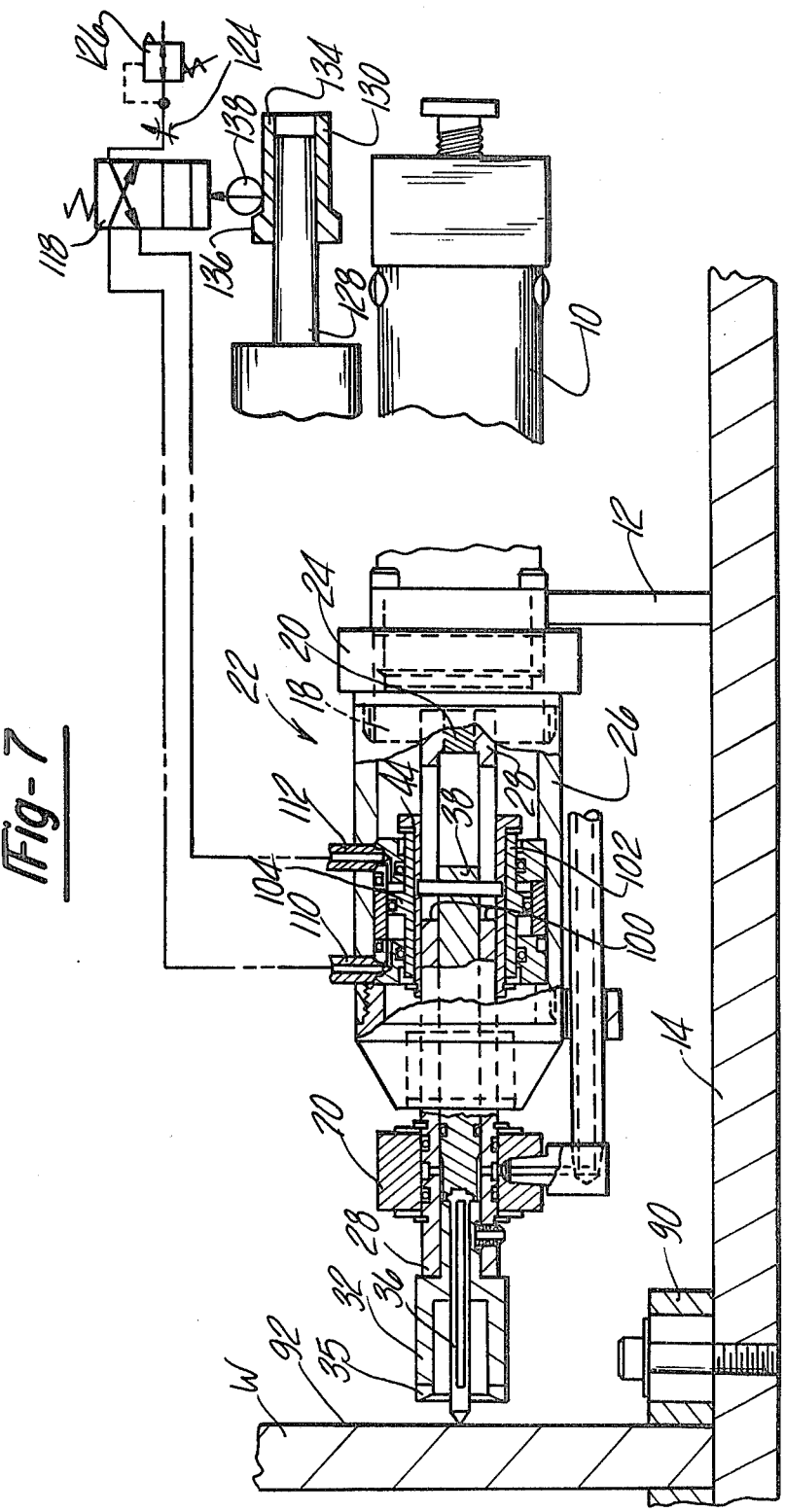
FIGS. 7, 8 and 9 are views similar to FIG. 6 showing the relative positions of various components of the machine throughout the successive stages of the cutting operation.
Figure 8:
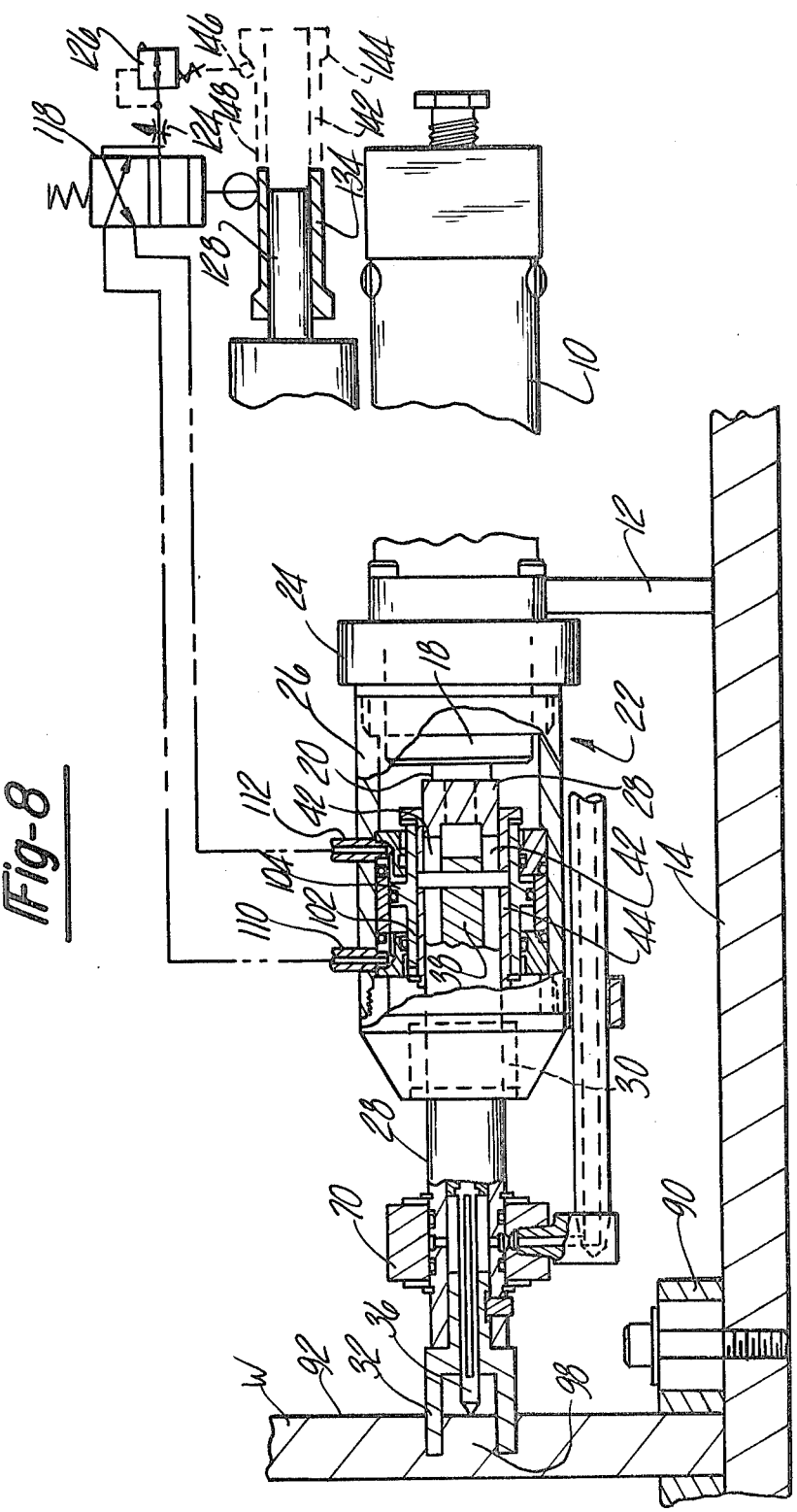

Referring to FIGS. 1 and 5, the machine includes a motor 10 suitably supported as by a bracket 12 on a base plate 14. In the illustrated embodiment motor 10 is an air motor adapted to be connected to a source of air under pressure by a fitting 16. Within motor 10 there is arranged an axially slideable quill 18 which supports for axial movement a rotary spindle 20. An arbor assembly, generally designated 22, is mounted on the forward end of motor 10 by an adaptor collar 24. Arbor assembly 22 includes an outer casing 26 which surrounds an arbor 28 threaded on the forward end of spindle 20. Arbor 28 is supported at the forward end of casing 26 for rotation by a suitable bearing 30. Within the hollow outer end of arbor 28 an annular cutter 32 is telescopically arranged and rigidly secured thereon by a set screw 34. The leading end of the cutter is formed with cutting teeth 35.

A pointed pilot pin 36 is slideably arranged with a close fit within the shank of cutter 32. In the arrangement illustrated in FIGS. 1 through 5 the inner or rear end of pilot pin 36 is fixedly connected to the outer or front end of a plunger 38 slideably arranged within the bore of arbor 28. A cross pin 40 extends through the inner end of plunger 38 and through diametrically opposed slots 42 which extend axially on arbor 28 adjacent the rear or inner end thereof. The opposite ends of pin 40 are connected to a sleeve 44 slideably arranged on the outer cylindrical surface of arbor 28. Sleeve 44 is in turn slideably arranged within an annular spring retainer 46. Within retainer 46 there is arranged a coiled compression spring 48. The rear end of spring 48 abuts against the end wall of retainer 46 and the forward end of spring 48 abuts against a thrust bearing 50 located axially against a flange 52 formed integrally on sleeve 44. On its opposite side flange 52 is embraced by a similar bearing 54 which is retained in place by a snap ring 56.

Spring retainer 46 is threaded into the bore of casing 26 at 57 (FIG. 5) and the rear end thereof is formed with a plurality of serrations 48 around the outer periphery thereof. Casing 26 is provided with an access opening 60 which registers axially with the serrations 58 so that spring retainer 46 is adjustable axially of casing 26 by rotating spring retainer 46 by means of a prying tool (such as a screwdriver) inserted through access opening 60 and engaged with the serrations 58. Spring retainer 46 is adapted to be locked in its adjusted position by a set screw 61.

As shown in FIG. 1, plunger 38 may be retained in a fixed retracted position relative to the casing by means of a pivoted latch 62 which hooks over the edge of bearing 54. Latch 62 is connected to a pivoted dog 64 by means of a link 66. Latch 62 is biased toward its latching position shown in FIG. 1 by means of a compression spring 68. Pivoted dog 64 lies in the path of travel of quill 18 such that when the quill moves forwardly a predetermined distance it pivots dog 64 (see FIG. 4) to release latch 62 and thus permit sleeve 44 to shift axially forwardly under the bias of spring 48. The forwardmost position of sleeve 44 is adjustably determined by a stop screw 49 threaded into the forward end of casing 26.

For the purpose of supplying coolant or cutting fluid to cutter 32 a bushing 70 is journalled on arbor 28 and axially fixed thereon by suitable means such as snap rings 72. At one side thereof a fluid fitting 74 is mounted in bushing 70 and communicates with an annular groove 76 in arbor 28. Groove 76 is connected by a plurality of radial apertures 78 with an annular space 80 within arbor 28 surrounding the inner end of pilot 36. The pilot has an axially extending groove 82 thereon which communicates with the annular space 80. A conduit 84 connects with fitting 74 and is slideably arranged in a bracket 86 on casing 26. Thus, pressurized fluid in conduit 84 is directed through the various passageways described to the inner periphery of cutter 32.

The workpiece through which a hole is to be formed is adapted to be fixedly mounted on base plate 14 by means of an adjustable clamp 90. Normally the workpiece W is located relative to the motor 10 so that the near face 92 of the workpiece is spaced slightly beyond the cutting teeth 35 at the leading end of the cutter. As shown in FIG. 1, in the retracted position of plunger 38 the pointed end of pilot pin 36 projects slightly beyond the teeth 35. The workpiece W is preferably located on base plate 14 so that it is spaced at least slightly axially forwardly of the pointed end of the pilot pin.

In the above described arrangement the motor is arranged in a horizontal plane. Obviously, it could be disposed vertically instead. In either case the terms "front" and "forward" are used to designate an axial direction toward the workpiece and the term "rear" designates the opposite direction, that is, the direction in which the cutting tool is retracted.

The modification shown in FIG. 5A is substantially exactly the same as shown in FIG. 1 with the exception, however, that the pilot pin 36 is not connected directly to the forward or outer end of plunger 38. Instead, the forward end of plunger 38 and the inner end of pilot pin 36 are spaced apart slightly and a very light coil compression spring 94 is arranged therebetween. With the arrangement shown in FIG. 5A the workpiece W is preferably mounted on base plate 14 so that initially pilot pin 36 contacts the face 92 at the center of the hole to be formed therein. However, as soon as plunger 38 is advanced a short distance, spring 94 is fully compressed and a solid driving connection is established between the plunger and the pilot pin.

In operation the quill 18 is in the retracted position shown in FIG. 1 and the spring cartridge 46 is in the cocked position and retained therein by trigger 62. Spring 48 is highly compressed and exerts a very substantial axial forward force on plunger 38. The drill motor 10 is started to advance quill 18 and rotate spindle 20. Thus, the cutter 32 is rotated and approaches face 92 of the workpiece W. Before teeth 35 actually engage the face 92 of the workpice (the position shown in FIG. 3), quill 18 trips dog 64 and, thus, releases sleeve 44 from the cocked position. This causes plunger 38 and the pointed pilot pin 36 to be projected forwardly with a high velocity and great force. When the pointed pilot pin impacts against the face 92 it forms a centering indentation therein at the center of the hole to be formed by the cutter. Thereafter the amount of force exerted by the pilot pin against the workpiece is determined by the axial compressed length of spring 48. This force remains constant until the cutter penetrates through the back face 96 of the workpiece since, until that time, the pointed end of the pilot pin remains fixedly embedded in the front face 92 of the workpiece. Thus, as the cutter rotates and advances into the workpiece it cuts an annular groove and simultaneously a cylindrical slug 98 within the cup-shaped cutter. As soon as teeth 35 of the cutter penetrate through the back face 96 of the workpiece (FIG. 5), the pilot pin 36 is no longer restrained axially. Thus, spring 48 shifts sleeve 44 axially forwardly until front bearing 54 abuts the end of stop screw 49. The force exerted by the pilot pin on slug 98 then drops to substantially zero. The amount of this forward travel of the pilot pin after the cutter penetrates through the workpiece is preferably relatively small, the pointed end of the pilot pin being shifted forwardly to a position just beyond face 92. The amount of axial final displacement of pilot pin 36 can be readily adjusted by varying the position of screw 49. In any event, since this forward displacement of pilot pin 36 is relatively small, the forward thrust on the cut slug 98 is of very short duration so that, even if slug 98 is ejected completely from within the cutter, it is ejected at a relatively low velocity.

It is possible that slug 98 will not be completely ejected from the cutter. However, as spindle 20 and arbor 28 are retracted the force of spring 48 will be sufficient to retain the pilot pin 36 generally in the position illustrated in FIG. 5 so that when the cutter is completely retracted to the position shown in FIG. 1 the center slug 98 will be slowly ejected therefrom. As arbor 28 approaches the end of its retraction stroke the forward ends 100 of slots 42 in the arbor engage pin 40 and displace the pin inwardly to the position shown in FIG. 1 wherein the spring cartridge 46 is again locked in the cocked position by the trigger 62.

From the above description it will be observed that the amount of force applied to the pilot pin after it engages the workpiece may be varied as desired by adjusting spring cartridge 46 axially of casing 26. As pointed out previously, this force remains constant until the cutter penetrates through the back face 96 of the workpiece. The fact that the uniform pressure applied to the pilot and the extent of axial movement of the pilot pin upon breakthrough of the cutter can both be varied independently of one another is very desirable. The maximum force applied to the workpiece by the cutter is determined by the material from which the workpiece is made, the flexibility of the workpiece, and the desired ejection velocity of slug 98 formed by the cutter. Likewise, the distance through which the pilot pin is shifted axially forwardly upon breakthrough depends upon the material being cut and the desired ejection velocity of the center slug 98. For example, if the workpiece were a piece of steel 1" thick, the force on the pilot pin could be relatively high and the final axial displacement of the pilot pin could be on the order of ¼" or more. On the other hand, if the workpiece were a piece of thin brittle plastic, then the maximum force applied by the pilot pin and the amount of its final axial displacement should be very short to prevent splintering of the workpiece around the edge of the hole being formed therein. Likewise, if the workpiece is formed of a relatively soft material (such as aluminum), spring cartridge 46 would be so adjusted axially that the force applied to the workpiece by the pilot pin would not be so great as to extrude the center slug out of the workpiece before breakthrough of the cutter.

The solid interconnection between the inner end of the pilot pin and the outer end of plunger 38 shown in FIGS. 1 through 5 would be employed where the workpiece is mounted in a fixed predetermined location relative to the cutter, the workpiece being so located that the center of the hole to be formed therein is initially aligned with the center of the pilot pin. In those instances where the center of the hole to be cut is simply prick punched or otherwise marked on the workpiece, then the pilot pin-plunger arrangement shown in FIG. 5A would be desirably employed so that the workpiece could be shifted laterally and vertically to a position wherein the pointed end of the pilot pin registers with the marked center on the workpiece. The workpiece would then be clamped on base plate 14 in this position. When trigger 62 is released the pilot pin will produce the desired centering indentation at the center of the hole to be cut.

Figure 9:
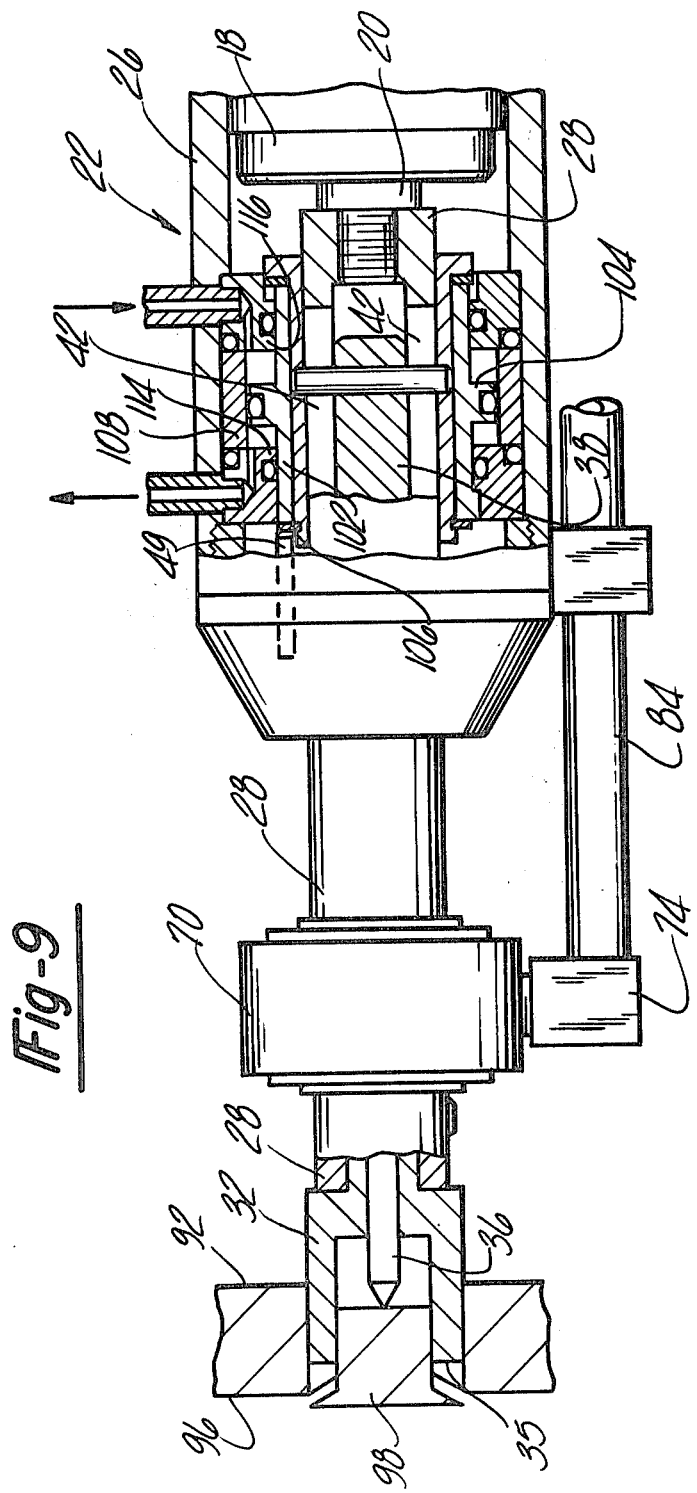

In the arrangement shown in FIGS. 6 through 9 the means for applying a uniform pressure to the pilot pin 36 while the cutter 32 is forming a hole through the workpiece is fluid pressure rather than mechanical spring pressure. Thus, the arrangement shown in FIGS. 6 through 9 differs from that shown in FIGS. 1 through 5 in that, instead of a spring cartridge, sleeve 44 is surrounded by an annular member 102 formed integrally with an annular piston 104. Annular member 102 is locked in a fixed position on sleeve 44 by a snap ring 106. An annular cylinder-forming member 108 surrounds piston 104 in sealed relation. The opposite ends of cylinder member 108 are provided with fittings 110,112 for connecting the cylinder to a source of pressure fluid. The maximum stroke of piston 104 within cylinder member 108 is determined by a pair of abutments 114, 116 adjacent the opposite ends of cylinder member 108. The actual stroke of piston 104 is preferably less than its maximum stroke and is determined by the adjustable stop screw 49 at the forward end of casing 26. As is best illustrated in FIG. 9, suitable seals are provided for preventing leakage of fluid from the piston-cylinder assembly.

The means for controlling the flow of fluid to and from cylinder 108 comprises a suitable spool valve (such as a four-way valve 118) having a pressure port P and an exhaust port E. Fitting 110 is connected to a port 120 and fitting 112 is connected to a port 122. Pressure port P is connected to a source of fluid under pressure through an adjustable flow control valve 124 and an adjustable pressure regulator 126. Exhaust port E is connected to tank.

As is customary with numerous air motors, motor 10 has associated with it a slave piston 128 arranged to move axially in unison with quill 18 and spindle 20. Slave piston 128 has a cam bushing 130 threaded thereon for axial adjustment. The cam surface on bushing 130 comprises a radially outer surface 132 and a radially inner surface 134 connected by a shoulder 136. Suitable means are provided for actuating the spool of valve 118 to its two positions in response to axial movement of bushing 130. These means are preferably in the form of a triggering device for a microswitch, an air valve or the like. In the arrangement illustrated in the drawings the triggering device is illustrated in the form of a roller 138 engagable with the cam surfaces on bushing 130 to control an air valve for shifting the spool in valve 118.

In FIG. 6 spindle 20 and plunger 38 are illustrated in their retracted positions. Roller 138 is engaging the high side 132 of the cam so that the spool in valve 118 connects port 120 with the pressure source through flow control valve 124 and pressure regulator 126. Thus, fluid at the desired pressure is directed to the front side of piston 104 and urges the piston to its fully retracted position. In this position cutter 32 and pilot pin 36 are in their fully retracted positions shown in FIG. 6. When motor 10 is energized, quill 18 is advanced and spindle 20 is rotated. This causes the cutter 32 to rotate and approach face 92 of the workpiece. Before the teeth 35 on the cutter actually engage the workpiece, roller 138 rides off the high side 132 of the cam onto the low side 134. This causes the spool within valve 118 to shift under the influence of spring 140 to the position shown in FIG. 7 wherein the rear side of piston 104 is now connected to the pressure source and the front side of piston 104 is connected to exhaust. When this occurs, plunger 38 is shifted axially forwardly to cause the pointed end of the pilot pin to impact against and indent face 92 of the workpiece. Regulator 126 permits adjustment of the pressure to a desired value. Thereafter, as the cutter advances it forms an annular groove in the workpiece which surrounds the central slug 98. As soon as the cutter penetrates through the back face 96 of the workpiece the fluid pressure on the rear side of piston 104 displaces plunger 38 axially forwardly until stop screw 49 is abutted by the annular member 102. This determines the extent of axial displacement of pilot pin 36 beyond face 92 of the workpiece. As pointed out with reference to the previous embodiment described, this displacement is relatively short so that, if the center slug 98 is ejected from within the cutter before the cutter is retracted, it will be ejected at a relatively slow velocity. When forward travel of the piston is arrested by stop screw 49, the force exerted by the pilot pin on slug 98 drops to zero. If slug 98 is not completely ejected from within the cutter when the annular member 102 abuts pin 49, it will slide out of the cutter when the cutter is retracted since the pilot pin remains in the position illustrated in FIG. 1 until the arbor retracts to substantially the position shown in FIG. 6.

When axial displacement of plunger 38 is controlled by fluid pressure rather than by compression springs, it is more readily feasible to reduce the pressure applied by the pilot pin to the center slug 98 in a programmable manner as the cutter penetrates through the back face of the workpiece by means other than the adjustable stop pin 49. For example, as shown in broken lines in FIG. 8, bushing 134 can be extended axially rearwardly as at 142 and provided with a second cam rise surface 144. The regulator valve 126 or the flow control valve 124 can be controlled by a roller 146 adapted to engage the cam rise surface 144 just before or shortly after the cutter penetrates through the workpiece to reduce the pressure on the back side of piston 104 to a very low value or even zero. If desired, the outer surface 148 of bushing extension 142 can be conically or otherwise shaped so that the pressure on the pilot pin diminishes in a programmable manner. Regardless of the specific means provided, in accordance with the present invention the pressure exerted by the pilot pin on the workpiece is maximum at the initiation of the cut and programmed to be either constant or progressively diminishing until the cutter is about to penetrate completely through the workpiece and then the force exerted by the pilot pin on the center slug 98 is reduced very substantially or even to zero when the forward end of the pilot pin has advanced axially to a position slightly beyond the front face 92 of the workpiece. In this manner the maximum pressure exerted by the pilot pin on the workpiece is applied before the cutter engages the workpiece and this pressure remains substantially constant or is reduced to some lesser value until the cutter penetrates or is about to penetrate completely through the workpiece. Then the pressure exerted by the pilot pin is reduced very substantially so that the ejection velocity of the slug 98 will be relatively low and a clean cut is formed at the bottom edge of the hole. It will be understood that even if the bushing extension 142 is employed to reduce the pressure in a programmed manner the force exerted by the pilot pin on the center slug is reduced to zero when annular member 102 abuts stop pin 49.

Experience has shown that with a machine according to the present invention extremely accurate holes can consistently be formed in workpieces. This accuracy results from the fact that the maximum pressure on the pilot pin is applied prior to the initiation of the cut, the pilot pin has a very close and accurate sliding fit in the shank of the cutter, and the arbor is supported rigidly in an accurate centered relation axially adjacent the cutter by means of the bearing 30 at the forward end of the arbor casing 26. To eliminate the problem that would arise in the event of misalignment of spindle 20 and arbor 28, the connection therebetween can comprise a universal joint 150 (FIG. 4) rather than the threaded connection shown in FIG. 2. In this manner a two point coaxial bearing arrangement is obtained, one bearing point comprising the pointed end of the pilot pin and the other the bearing 30 with which the pilot pin is coaxial.

Since the desired maximum pressure applied by the pilot pin to the workpiece is encountered at the initiation of the cutting operation, it follows that motor 10 and its power requirements are only those necessary to accommodate this initial maximum pressure. In a conventional annular cutter wherein the pilot pin is spring biased and progressively retracted as the cutter penetrates through the workpiece, if the initial force on the pilot pin is adequate to retain it in an accurately centered position on the workpiece, then the force of the spring upon breakthrough is substantially greater and the motor for driving the arbor has to be sufficiently large to accommodate this substantially greater force.

I claim:
1. A machine for cutting holes in a workpiece comprising, a base, a motor, means for mounting said motor in a fixed position on said base, an axially shiftable, rotary driven spindle on said motor, an arbor fixedly connected at its rear end to said spindle to rotate and shift axially with the spindle, said arbor having means at its front end for mounting thereon an annular cutter having a coaxial pointed pilot pin shiftable axially therethrough, means on said base for supporting a workpiece thereon in a fixed position spaced axially forwardly beyond the leading end of the cutter when the spindle is in its retracted position, said spindle being adapted to be advanced axially to cause the leading end of the cutter to engage and cut a circular groove in the adjacent face of a workpiece supported on said base, said arbor having a central axial bore therein, a plunger slideable axially in said bore, means for operably connecting the forward end of the plunger to the rear end of the pilot pin, means for applying a predetermined maximum axial force to said plunger of sufficient magnitude to cause the front pointed end of the pilot pin to firmly engage said face of the workpiece in an axially fixed first position with said maximum force at the axial center of the hole to be formed therein, and means for reducing the force applied by the pilot pin to the workpiece to a value very substantially lower than the magnitude of said maximum force whenever the pointed end of the pilot pin has been displaced axially forwardly beyond said fixed position to a predetermined second fixed position only slightly beyond said face of the workpiece, whereby, as soon as the cutter penetrates through the workpiece and the plunger has displaced the pointed end of the pilot pin and the circular slug within the cutter to said second position, the force exerted by the pilot pin on said slug will have been reduced to said very low value.

2. A machine as called for in claim 1 wherein said force reducing means is adapted to reduce said maximum force to substantially zero when said pilot pin has been displaced to said second fixed position beyond said face of the workpiece.

3. A machine as called for in claim 2 wherein said force reducing means comprises means for limiting axial displacement of said plunger in an axially forward direction to a position wherein the forward end of the pilot pin is located at said second fixed position.

4. A machine as called for in claim 3 wherein said means for limiting axial movement of the plunger are adjustable to vary said second fixed position of the pilot pin.

5. A machine as called for in claim 1 wherein said means for applying said axial force to said plunger comprises a sleeve surrounding said arbor and axially slideable thereon, said plunger being connected to said sleeve for axial movement therewith and means for applying said force to said sleeve.

6. A machine as called for in claim 5 wherein said means for reducing said force comprises means fixed relative to said motor and adapted to be abutted by said sleeve when the sleeve is displaced forwardly to a predetermined position relative to said motor.

7. A machine as called for in claim 6 wherein said sleeve comprises a piston and including means fixed relative to the motor and defining a cylinder in which the piston is axially shiftable, said force applying means comprising means for applying pressure fluid to one side of the piston to displace the plunger and the pilot pin forwardly.

8. A machine as called for in claim 7 including means for applying fluid pressure to the opposite side of the piston to retract the plunger and pilot pin.

9. A machine as called for in claim 1 wherein said force applying means comprises a fluid cylinder fixed relative to said motor, a piston axially shiftable in said cylinder, means forming a driving connection between said piston and plunger and means for directing fluid under pressure to one side of the piston to displace the plunger in an axially forward direction.

10. A machine as called for in claim 9 including means for directing fluid under pressure to the opposite side of said piston for retracting the plunger and pilot pin.

11. A machine as called for in claim 9 including means for varying the pressure applied to said one side of said piston for adjusting said maximum force to a desired magnitude.

12. A machine as called for in claim 9 including means for varying the rate of flow of pressure fluid to said one side of said piston to control the rate of displacement of said plunger.

13. A machine as called for in claim 9 wherein said means for reducing said force comprises means for reducing the pressure of the fluid directed to said one side of said piston.

14. A machine as called for in claim 13 including means for actuating the means for reducing said pressure in response to displacement of the arbor in a forward direction.

15. A machine as called for in claim 14 wherein said actuating means are adapted to actuate the pressure reducing means before the pointed end of the pilot pin has been displaced to said second fixed position.

16. A machine as called for in claim 9 wherein said means for reducing said force comprises an abutment fixed relative to said fluid cylinder and adapted to be engaged by said piston to limit axial movement thereof in a forward direction.

17. A machine as called for in claim 1 wherein said means for interconnecting the forward end of the plunger with the rear end of the pilot pin includes an axially compressible member disposed between the pilot pin and plunger biasing the pilot pin axially forwardly, said member being axially compressible to a position wherein a substantially solid driving connection is established between the pilot pin and plunger by an axial force which is only a small fraction of said maximum force whereby, when the front end of the pilot pin engages a workpiece and said maximum force is applied to the plunger, a substantially solid driving connection is established between the plunger and the pilot pin.

18. A machine as called for in claim 17 wherein said compressible member comprises a light coil spring.

19. A machine as called for in claim 1 including means responsive to forward movement of said arbor to a predetermined position for applying said maximum force to the plunger before the leading end of the cutter engages said face of the workpiece.

20. A machine as called for in claim 1 wherein said force applying means is adapted to apply a force of constant magnitude to said plunger.

21. A machine as called for in claim 20 wherein said means for applying said substantially constant force to the plunger comprises compression spring means axially compressed between a first abutment fixed relative to the motor and a second abutment fixed relative to the plunger.

22. A machine as called for in claim 21 wherein said first abutment is axially adjustable relative to the motor for varying the value of said substantially constant force.

23. A machine as called for in claim 22 including releasable trigger means for initially compressing said spring means to a length less than the distance between said abutments to thereby apply an initial force to the plunger substantially greater than said constant force whereby, when said trigger means are released, the pointed front end of the pilot pin is impacted against and forms a centering indentation in said face of the workpiece.

24. A machine as called for in claim 21 including an axially shiftable sleeve on said arbor connected with said plunger for axial movement therewith, said second abutment being formed on said sleeve and engaging the forward end of said compression spring means.

25. A machine as called for in claim 24 wherein said first abutment comprises an annular member surrounding said arbor.

26. A machine as called for in claim 25 wherein said motor has an annular forward extension thereon, said first abutment being axially adjustable within said extension.

27. A machine as called for in claim 26 wherein said annular member has an axially threaded connection with said forward extension.

28. A machine as called for in claim 26 wherein said means for reducing said force comprises an abutment on said extension adapted to engage said sleeve and limit the forward movement thereof.

29. A machine as called for in claim 28 wherein said last-mentioned abutment is axially adjustable on said extension.

30. A machine as called for in claim 1 including means for retracting the plunger to a position wherein the pointed end of the pilot pin is disposed in a third fixed position spaced rearwardly from said face of the workpiece and for applying an axial forward force to said plunger substantially higher than said maximum force when the plunger is in said retracted position and means responsive to movement of the arbor to a predetermined forward position for causing said plunger to move forwardly under the bias of said higher force whereby to cause the pointed end of the pilot pin to be impacted against and form a centering indentation in said face of the workpiece and thereby assume said first position.

31. A machine as called for in claim 1 wherein said pilot pin has a close sliding fit in said cutter and including bearing means on said motor rotatably supporting said arbor adjacent the front end thereof.

32. A machine as called for in claim 31 wherein the connection between the front end of the spindle and the rear end of the arbor comprises a universal joint.

* * * * *